(12) United States Patent
Feretti et al.

(10) Patent No.: US 12,623,726 B2
(45) Date of Patent: May 12, 2026

(54) MOTOR VEHICLE HOOD

(71) Applicant: FERRARI S.P.A., Modena (IT)

(72) Inventors: Manuel Feretti, Modena (IT); Angelo Narducci, Modena (IT)

(73) Assignee: FERRARI S.P.A., Modena (IT)

( * ) Notice: Subject to any disclaimer, the term of this patent is extended or adjusted under 35 U.S.C. 154(b) by 372 days.

(21) Appl. No.: 18/403,121

(22) Filed: Jan. 3, 2024

(65) Prior Publication Data

US 2024/0217588 A1     Jul. 4, 2024

(30) Foreign Application Priority Data

Jan. 4, 2023     (IT) ........................ 102023000000042

(51) Int. Cl.
B62D 25/12     (2006.01)
B60R 5/02     (2006.01)
B60R 21/34     (2011.01)

(52) U.S. Cl.
CPC ................ B62D 25/12 (2013.01); B60R 5/02 (2013.01); B60R 21/34 (2013.01); B60R 2021/343 (2013.01)

(58) Field of Classification Search
None
See application file for complete search history.

(56) References Cited

U.S. PATENT DOCUMENTS

| | | | | |
|---|---|---|---|---|
| 6,767,052 B2 * | 7/2004 | Kubota | ................... | B60R 21/34 |
| | | | | 296/193.11 |
| 8,016,347 B2 * | 9/2011 | Uchino | ................... | B60R 21/34 |
| | | | | 296/193.11 |
| 8,485,588 B1 * | 7/2013 | Voss | ........................ | F16F 7/121 |
| | | | | 296/193.11 |
| 10,471,999 B2 * | 11/2019 | Yamamoto | ........... | B62D 25/082 |
| 2008/0122261 A1 | 5/2008 | Seo | | |
| 2009/0065277 A1 * | 3/2009 | Wang | ................... | B62D 25/105 |
| | | | | 180/69.2 |

FOREIGN PATENT DOCUMENTS

| | | | | |
|---|---|---|---|---|
| DE | 2934060 A1 | 3/1981 | | |
| DE | 102013208275 A1 | 11/2013 | | |
| DE | 202018100293 U1 | 2/2018 | | |
| EP | 2239184 A1 | 10/2010 | | |
| GB | 2056923 A | 3/1981 | | |
| GB | 2343419 A | * 5/2000 | ........... | B62D 25/105 |

OTHER PUBLICATIONS

Italian Search Report and Written Opinion in IT Application No. 102023000000042, mailed Jul. 17, 2023 (11 pages) an English translation attached hereto.

* cited by examiner

*Primary Examiner* — Joseph D. Pape
(74) *Attorney, Agent, or Firm* — Leason Ellis LLP

(57)     ABSTRACT

A motor vehicle includes a front hood that has a supporting skeleton directly or indirectly fixed to an outer covering skin, which defines part of an outer contour of the motor vehicle; the hood has at least one deformable portion, shaped so as to have a C-shaped cross-section and comprising an upper wing and a lower wing, facing each other, and a connecting portion joining the upper and lower wings to each other; the lower wing forms part of a plate element, which is distinct from the supporting skeleton and from the outer covering skin, and is arranged between the supporting skeleton and the outer covering skin, or below the supporting skeleton, vertically aligned with the gaskets provided to ensure the seal for an underlying compartment.

12 Claims, 4 Drawing Sheets

MOTOR VEHICLE HOOD

CROSS-REFERENCE TO RELATED APPLICATIONS

This patent application claims priority from Italian patent application no. 102023000000042 filed on 4 Jan. 2023, the entire disclosure of which is incorporated herein by reference.

TECHNICAL SECTOR

This invention relates to a motor vehicle provided with a hood.

PRIOR ART

In the automotive market, in general, front hoods have a supporting skeleton, facing downwards when the hood is closed, and a panel or covering skin, shaped so as to define the outer contour of the motor vehicle. This outer skin is fixed to the skeleton, for example via crimping, glueing and/or welding. Typically, the skeleton and outer skin may be made of steel, aluminium alloys, or materials with carbon fibres.

There is a need to provide special technical solutions so that a sufficient level of safety for pedestrians, in the event of an accident where the head of the pedestrian hits the outer skin of the hood, is ensured.

In particular, in some markets, technical devices that have this purpose are necessary in light of current regulations or regulations that will enter into force in the near future.

One possible technical solution lies in ensuring greater space below the hood so that the hood can be freely deformed without meeting relatively rigid bodies that may be present below, both if the hood encloses an engine compartment and if the hood encloses a luggage compartment.

In the field of this type of solution, it is, in any case, useful to optimise the contour and deformability features of the hood, so as to maximise the absorption of energy and, thus, obtain maximum safety performance during a collision between the head of a pedestrian and the outer skin of the hood.

One purpose of this invention is, thus, that of meeting the need described above, preferably in a simple and/or effective and/or cost-effective way.

SUMMARY OF THE INVENTION

The above-mentioned purpose is achieved by a motor vehicle, as defined in claim 1.

The dependent claims define particular embodiments of the invention.

BRIEF DESCRIPTION OF THE DRAWINGS

For a better understanding of this invention, preferred embodiments will be described below, by way of non-limiting examples, with reference to the accompanying drawings, wherein.

Figure 2:
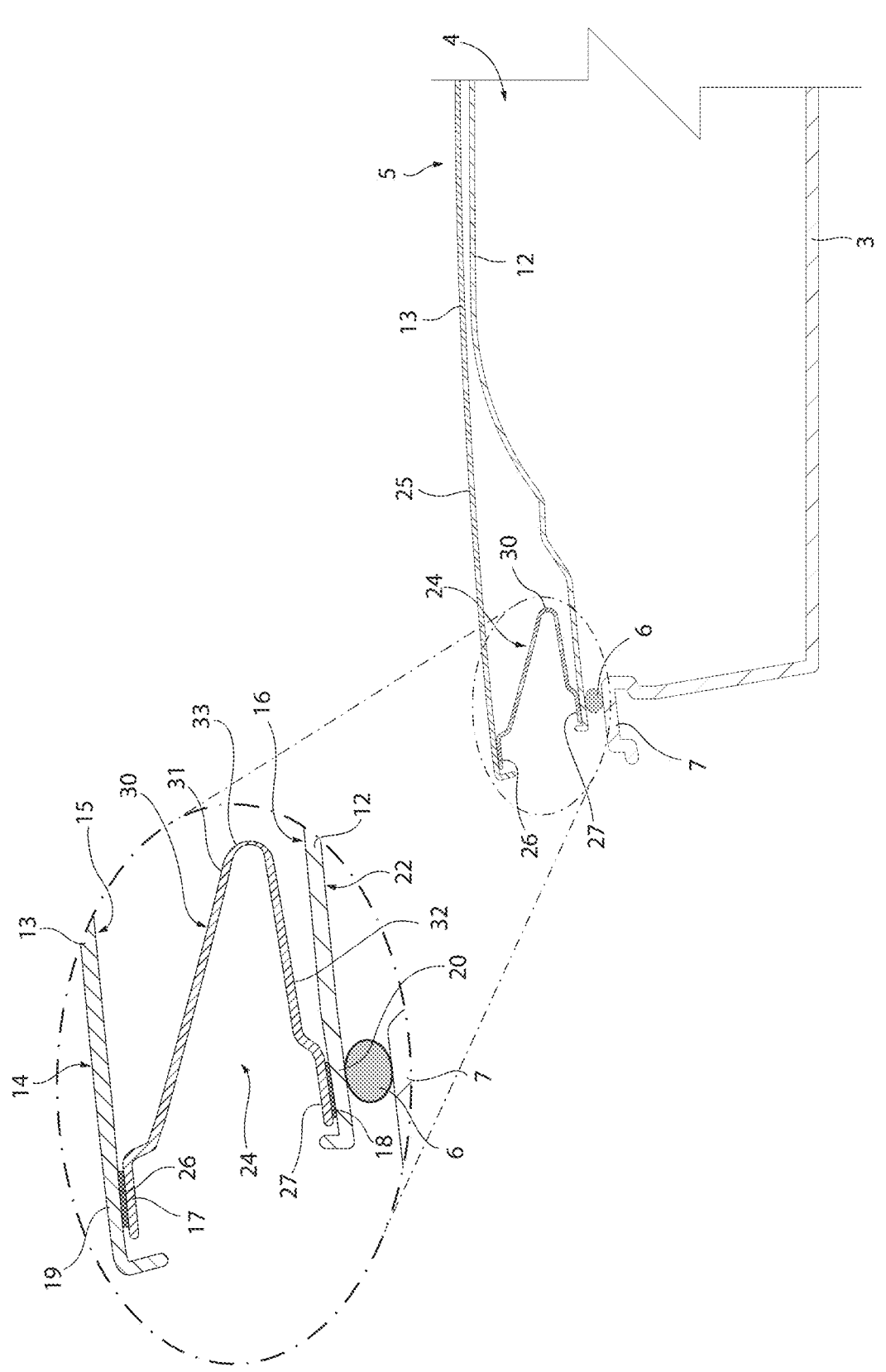
FIG. 2 is a cross-section according to a vertical cross-section plane, identified by the line II-II in FIG. 1, i.e.
Figure 3:
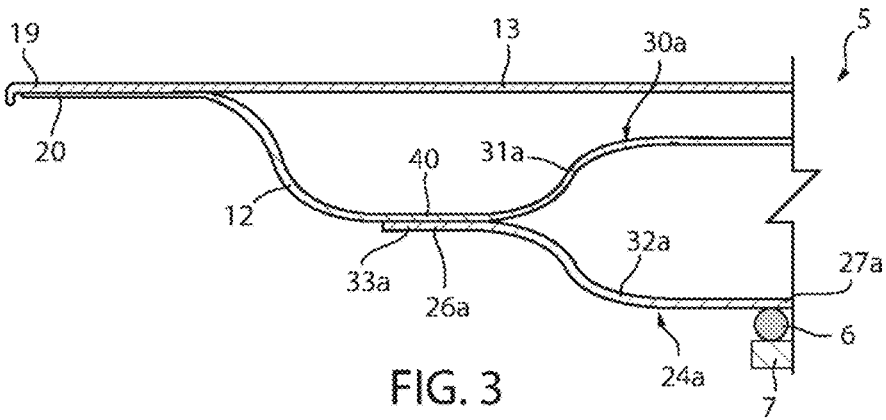
Figure 4:
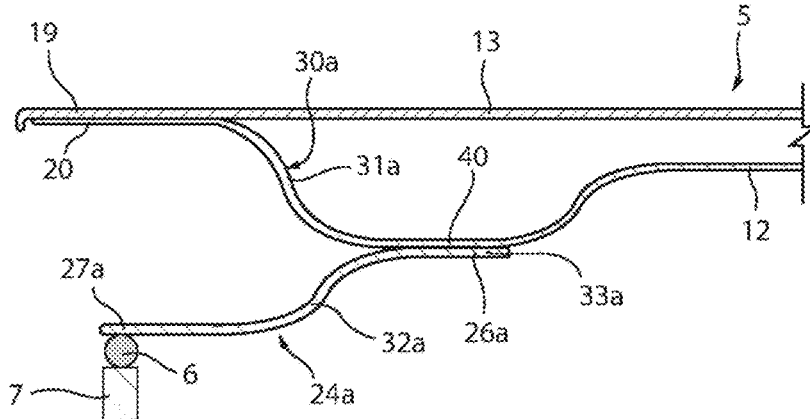
Figure 5:
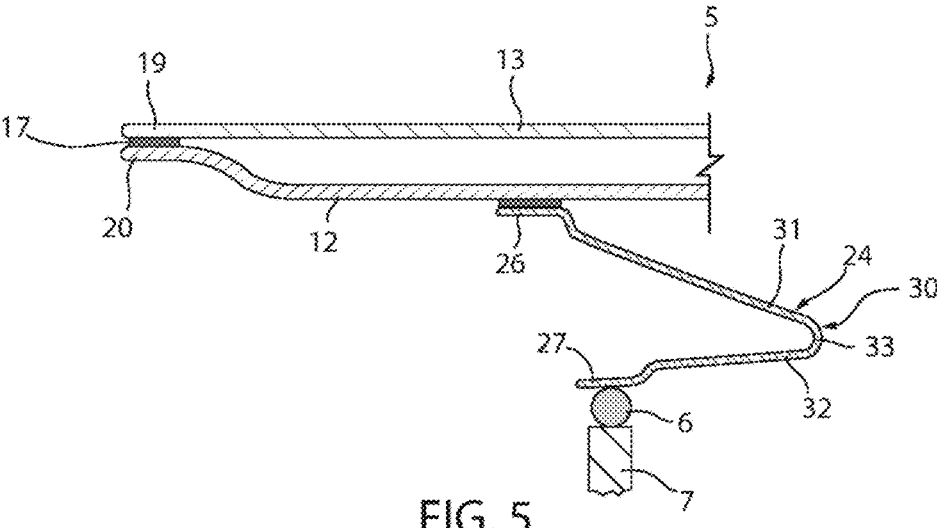

orthogonal to a forward direction of the motor vehicle, with a detail of the cross-section that is also shown on an enlarged scale;

FIGS. 3 and 4 are similar to the visible enlarged view in FIG. 2, and illustrate a different embodiment of this invention, according to two possible alternatives;

FIG. 5 is also similar to the enlarged view in FIG. 2, and illustrates a variant regarding the position of a component that is visible in that enlarged view; and FIGS. 6 to 9 show, schematically, other variants of the above-mentioned component (since schematised, the images are not exactly to scale, nor do they conform precisely to the previous figures and/or to the actual component).

DETAILED DESCRIPTION OF PREFERRED EMBODIMENTS OF THE INVENTION

Figure 1:
FIG. 1 is a partial perspective view of a preferred embodiment of the motor vehicle according to the dictates of this invention, with a hood shown in a lowered, closed position.

In FIG. 1, reference number 1 indicates a motor vehicle (partially illustrated) as a whole. The motor vehicle comprises a body or frame (not illustrated) and a basin 3, which is supported by the body and defines a compartment 4 (FIG. 2) for housing luggage and objects to transport while travelling. According to variants not illustrated, the compartment 4 could define an engine compartment (without am appropriate basin, but directly defined by the body).

The motor vehicle 1 also comprises a hood 5, which is coupled to the body and/or to the basin 3, in a way not illustrated, so it can rotate between a lowered, closed position, visible in FIG. 1, and a raised, opened position, not illustrated. In the lowered, closed position, the hood 5 closes the compartment 4 at the top using the interposition of gaskets 6, schematically illustrated in FIG. 2.

With reference to this figure, the gaskets 6 are carried in a fixed position by an upper edge 7 of the basin 3 (in the case of an engine compartment, the gaskets are carried in a known way by other components, or directly by the body).

The hood 5 comprises a supporting skeleton 12 and an outer covering skin 13, directly or indirectly fixed to the skeleton 12. These two components are preferably made of composite materials with carbon fibres, but according to other variants (for example those shown in FIGS. 3 and 4) they may be made of aluminium alloys. Generally, the material of these components is not an essential element of this invention.

As can be seen in the enlarged view in FIG. 2, the skin 13 has two surfaces 14 and 15 opposite each other, of which the surface 14 defines part of the outer contour of the motor vehicle 1, while the surface 15 faces towards the skeleton 12 and is coupled to a surface 16 of this skeleton 12, preferably by adhesive layers or strips. In this example in this figure, adhesive layers or strips 17 and 18 are provided on corresponding side edges 19 and 20 of the skin 13 and of the skeleton 12, along the perimeter of the surfaces 15 and 16. In particular, when the hood 5 is closed, the gaskets 6 rest, to create a seal, against a surface 22 of the skeleton 12 that is opposite the surface 16, right at the side edge 20.

According to one aspect of this invention, the hood 5 comprises at least one plate element 24, which is separate from the skeleton 12 and from the skin 13 and is fixed to the skeleton 12, preferably by glueing. In the case considered in FIG. 1, the hood 5 comprises two side portions 25, which are opposite and symmetrical to each other in relation to a vertical median plane of symmetry and each one comprises a corresponding element 24 (arranged, thus, along the corresponding side edge of the skeleton 12).

In particular, longitudinally (in a direction parallel to the advancement axis A of the motor vehicle 1) the elements 24 only extend in a rear, intermediate zone of the side portions 25 of the hood 5.

Again, with reference to FIG. 2, in this embodiment the element 24 is arranged between the skeleton 12 and the skin 13 and connects these two components: the element 24 comprises an end appendage 26 glued to the surface 15 via the adhesive layer 17 and another end appendage 27 glued to the surface 16 via the adhesive layer 18.

According to one aspect of this invention, the element 24 comprises a deformable portion 30, which is shaped so as to have a C-shaped cross-section, at least at an intermediate zone of the element 24; this cross-section consists of:

an upper wing 31 and a lower wing 32, facing and spaced apart from each other, and an intermediate connecting portion 33 defined, in particular, by a curved portion, which joins the wings 31 and 32 together; in this example, the connecting portion 33 horizontally points towards the centre of the hood 5.

Thanks to this C-shaped profile, in substance, the deformable portion 30 of the element 24 behaves like a clip spring, which is deformed when the wings 31 and 32 are brought closer together in response to a compression downwards exerted by the skin 13 during an accident, for example a collision with a pedestrian on the surface 14. In other words, the C-shaped profile of the deformable portion 30 is such as to dampen the downwards movement of the skin 13, since the deformation consists of an elastic part and a dissipative plastic part, and best absorbs the collision, since the hood 5 succeeds in sinking more than in known solutions.

According to a preferred aspect of this invention, the connecting portion 33 is less thick than the upper wing 31 and lower wing 32, to optimise the deformation phenomenon during the collision. In particular, the reduction in thickness defines a weakening that leads to concentrating the deformation in the connecting portion 33, to best perform the above-mentioned dampening function and, thus, optimise the absorption of the collision energy.

For example, the connecting portion 33 has a thickness between 33% and 75% of that of the wings 31 and 32. In particular, the element 24 is made of composite material, i.e. plastic material reinforced with fibres, so that it is produced by overlapping several layers of material, during the manufacturing process: assuming that the wings 31 and 33 consist of three layers, the connecting portion 33 preferably consists of one or two layers (with a thickness equal to approximately 33% and, respectively, 67% of that of the wings 31 and 32); assuming, in contrast, that the wings 31 and 32 consist of four layers, the connecting portion 44 can consist of two or three layers (with a thickness equal to approximately 50% and, respectively, 75% of that of the wings 31 and 32).

In the specific illustrated example, in the cross-section, the wings 31 and 32 have a basically straight contour from the connecting portion 33 to the appendages 26, 27, but they may also be curved.

In addition, in the specific example illustrated, in cross-section, the profile of the wing 31 has a greater dimension than the wing 32.

The variant of FIG. 5 differs from FIG. 2 due to the fact that the skeleton 12 is arranged between the element 24 and the skin 13. Therefore, the side edges 19 and 20 of the skin 13 and of the skeleton 12 are directly fixed together (for example, using a single adhesive layer 17), and preferably the appendage 27 defines a lower shoulder where the corresponding gasket 6 rests to create a seal.

According to a variant, not illustrated, the connecting portion 33 horizontally points towards the outside, instead of pointing towards the centre of the hood 5.

FIG. 4 shows a different embodiment, advantageous in terms of manufacturing processes when aluminium alloys are used instead of composite materials with carbon fibres.

The parts illustrated in FIG. 4 are indicated by the same reference numbers used in FIGS. 2 and 5, where these parts correspond among the various embodiments.

As in FIG. 5, the side edges 19 and 20 of the skin 13 and of the skeleton 12 are directly fixed to each other (i.e. without intermediate components), according to known methods, preferably by glueing. The element 24 is replaced by a plate element 24a and the skeleton 12 is placed between the skin 13 and the element 24a. The latter comprises a lower wing 32a and an appendage 27a, which defines a lower shoulder where the corresponding gasket 6 rests to create a seal.

In relation to FIGS. 2 and 5, the element 24a comprises an appendage 26a that is arranged at the opposite end in relation to the appendage 27a and is fixed to a portion 40 of the skeleton 12, for example via rivets, nails, glueing, or welding of any type (for hoods made of aluminium alloys or steel).

In this case too, there is a deformable portion 30a with a C-shaped cross-section, with a similar function to the one of the deformable portion 30, described above. The deformable portion 30a comprises:

the lower wing 32a of the element 24a, an upper wing defined by an intermediate portion 31a of the skeleton 12, that has opposite ends connected, respectively, to the portion 40 and to the side edge 20, and an intermediate connecting portion 33a, which comprises, in turn, the appendage 26a and the portion 40 (with their fastening systems).

In addition, similarly to FIGS. 2 and 5, the connecting portion 33a horizontally points towards the centre of the hood 5.

In the variant in FIG. 3, instead, the situation is the opposite, i.e. the connecting portion 33a points horizontally towards the outside of the hood 5.

Figure 6:
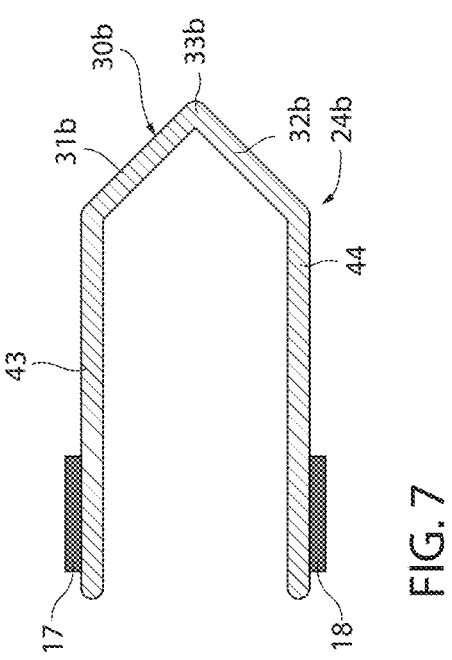
Figure 7:
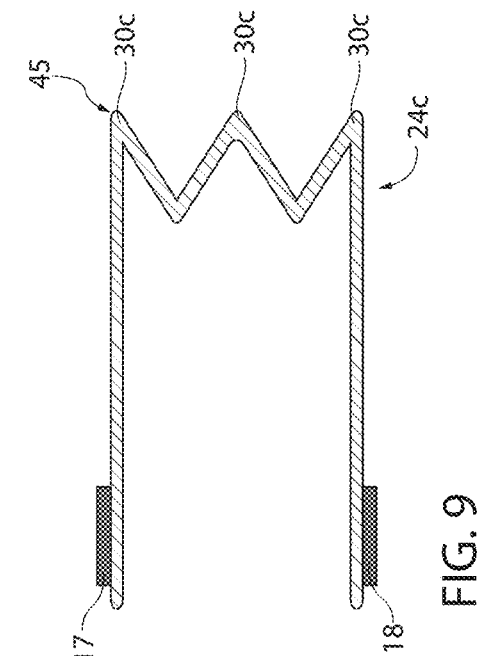

In the variants shown in FIGS. 6 and 7, the element 24 is replaced by an element 24b wherein the connecting portion 33b has a reduced bending radius and the profile of the wings 31b and 32b basically have the same width. In the example in FIG. 7, then, at the opposite end in relation to the connecting portion 33b, the wings 31b and 32b are connected to respective straight portions 43 and 44, parallel to each other.

Figure 8:
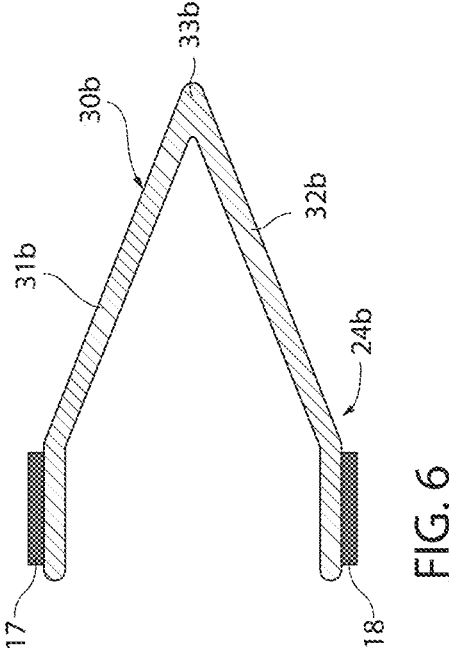
Figure 9:
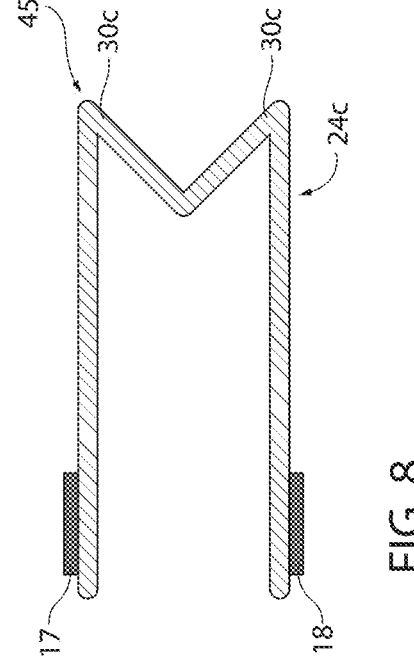

In the variants in FIGS. 8 and 9, the element 24 is replaced by an element 24c comprising an intermediate portion 45 that has a cross-section with an accordion-like or gusseted contour. Therefore, the intermediate portion 45 consists of a succession of at least two deformable portions 30c, each having a cross-section with a C-shaped contour.

In use, in the event of an accident where the head of a pedestrian collides against the skin 13 of the hood 5, the deformable portions 30, 30a, 30b, 30c collapse so as to perform a function of dampening and, thus, absorbing the collision, as already described above in more detail.

This absorption function of the collisions is particularly advantageous, in part thanks to the position of the elements 24, 24a, 24b, 24c: the latter (in particular, the upper wing 31 and 31a) are aligned vertically with the components of the motor vehicle 1 that support the gaskets 6, when the hood 5 is closed. These components (defined by the edges 7 of the basin 3, in the specific illustrated case) are relatively rigid, so that they tend to negatively influence the degree of safety in the event of an accident: the presence and position of the elements 24, 24*a*, 24*b*, 24*c* tend to compensate for this stiffness, thus improving the safety in the event of a collision along the perimeter of the skin 13 of the hood 5.

The advantages of the elements 24, 24*a*, 24*b*, 24*c* are clear. These, alone or in combination with parts of the skeleton 12, define deformable portions that have a C-shaped cross-section, which are excellent for absorbing energy during a collision, at the resting points defined by the gaskets 6 and by the edges 7 of the basin 3.

Lastly, it is clear from the foregoing that modifications may be made to the motor vehicle 1, and variations produced thereto, which is described with reference to the appended figures, while remaining within the scope of protection of this invention, as defined in the appended claims included below.

In particular, the deformable portions and the corresponding elements 24, 24*a*, 24*b*, 24*c* may be arranged in different positions in relation to the side portions 25 (for example, they may be arranged at the front end and/or rear end of the hood); and/or they may be different in number, in relation to what is indicated above by way of example.

In addition, the contour of the C-shaped cross-section formed from the deformable portions 30, 30*a*, 30*b* could have an outline, proportions, curves and/or dimensions that are different from what is illustrated in the above examples.

The invention claimed is:

1. A motor vehicle (1) comprising:

a front compartment (4);

a hood (5), which, in at least one operating condition, closes said front compartment (4) at the top and comprises:

a) a supporting skeleton (12);

b) an outer covering skin (13) defining, in use, an outer contour of the motor vehicle and attached directly or indirectly to said supporting skeleton (12);

gaskets (6) carried by at least one support element (7) and placed between said hood (5) and said support element (7) to ensure the seal of said front compartment (4) when closed by said hood (5);

wherein said hood (5) comprises at least one deformable portion (30, 30*a*, 30*b*), shaped so as to have a C-shaped cross-section and defined by:

an upper wing (31, 31*a*, 31*b*) and a lower wing (32, 32*b*) facing each other, and a connecting portion (33, 33*a*) joining said upper and lower wings to each other;

wherein said lower wing (32, 32*b*) forms part of a plate element (24, 24*a*, 24*b*, 24*c*), which is distinct from said supporting skeleton (12) and from said outer covering skin (13), and has one end (27, 26, 26*a*) coupled to said supporting skeleton (12);

wherein said plate element (24, 24*a*, 24*b*, 24*c*) is arranged between said supporting skeleton (12) and said outer covering skin (13), or said supporting skeleton (12) is arranged between said plate element and said outer covering skin (13);

and wherein said plate element (24, 24*a*, 24*b*, 24*c*) is arranged vertically aligned with said gaskets (6) and with said support element (7).

2. The motor vehicle according to claim 1, wherein said upper wing (31*a*) is defined by an intermediate portion of said supporting skeleton (12), and said end (26*a*) constitutes part of said connecting portion (33*a*).

3. The motor vehicle according to claim 1, wherein the entire said deformable portion (30, 30*b*) constitutes part of said plate element (24, 24*b*, 24*c*).

4. The motor vehicle according to claim 3, wherein said end (27) is glued to said supporting skeleton (12).

5. The motor vehicle according to claim 4, wherein said plate element (24) has a further end (26) glued to said outer covering skin (13).

6. The motor vehicle according to claim 3, wherein said plate element (24*c*) comprises an accordion-like or gusseted portion (45), in turn comprising said deformable portion (30*c*).

7. The motor vehicle according to claim 3, wherein said connecting portion (33) has a thickness less than the one of said upper and lower wings (31, 32).

8. The motor vehicle according to claim 7, wherein said connecting portion (33) has a thickness between 33% and 75% of the one of said upper and lower wings (31, 32).

9. The motor vehicle according to claim 1, wherein said connecting portion (33) faces horizontally towards the centre of the hood.

10. The motor vehicle according to claim 1, wherein said hood (5) has a vertical plane of symmetry and comprises two side portions (25), opposite and symmetrical to each other with respect to said vertical plane of symmetry; and wherein each of said side portions (25) comprises one respective said deformable portion and one respective said plate element.

11. The motor vehicle according to claim 1, wherein, when said front compartment (4) is closed by said hood, said gaskets (6) are coupled to said plate element, if said supporting skeleton (12) is arranged between said plate element and said outer covering skin (13), or to said supporting skeleton (12), if said plate element is arranged between said supporting skeleton (12) and said outer covering skin (13).

12. The motor vehicle according to claim 1, wherein said front compartment (4) is provided for housing luggage and objects to be transported while travelling, and is defined by a front basin (3) supported by a motor vehicle body; said gaskets (6) being carried in a fixed position by an upper edge of said front basin (3), and said upper edge defining said support element (7).

\* \* \* \* \*